Dec. 6, 1932.   H. R. DE CRESSEY   1,890,215

SAUSAGE CASING

Filed Nov. 17, 1930

Inventor.
Haswell R. De Cressey.
By Dyrenforth, Lee, Chritton & Wiles
Attys.

Patented Dec. 6, 1932

1,890,215

UNITED STATES PATENT OFFICE

HASWELL R. DE CRESSEY, OF SAN FRANCISCO, CALIFORNIA, ASSIGNOR TO THE VISKING CORPORATION, OF CHICAGO, ILLINOIS, A CORPORATION OF VIRGINIA

SAUSAGE CASING

Application filed November 17, 1930. Serial No. 496,315.

The invention relates to sausage casings and is particularly adapted to be embodied in sausage casings formed from cellulose.

Cellulose sausage casings may be produced from viscose which is obtained by practicing the method briefly described in United States Letters Patent No. 1,612,508 granted to William F. Henderson and Harold E. Dietrich, December 28, 1926. The viscose is excluded through an annular orifice to form the casing or tubing and is subjected to coagulating and regenerating baths after which it is washed in water. The casing is then preferably treated with glycerine or any other suitable hygroscopic agent, and after being dried is ready for use.

In the manufacture of the larger sausages like salami and bologna, it is necessary to regulate the formula and the process so that the sausage mixture possesses good binding power and will therefore absorb water, meat juices and fat.

The binding power is often impaired by the use of an insufficient percentage of ingredients of high binding power, such as an emulsion of bull meat, or by the use of ingredients which have been overheated in grinding. If the binding power has been impaired and the mixture is stuffed into a cellulose sausage casing, and is then smoked and cooked, water or fat pockets may develop between the sausage and the casing so that it does not have a pleasing appearance. If an attempt is made to puncture the casing to permit the water or fat to escape, the usual result is that the casing splits.

Casings embodying the invention are adapted to permit escape of the water or fat and will not split. The use of the improved casings insures that the sausages will have a pleasing appearance.

Many other objects and advantages of the invention will become apparent as the following description progresses, reference being had to the accompanying drawing, wherein,—

Figure 1:
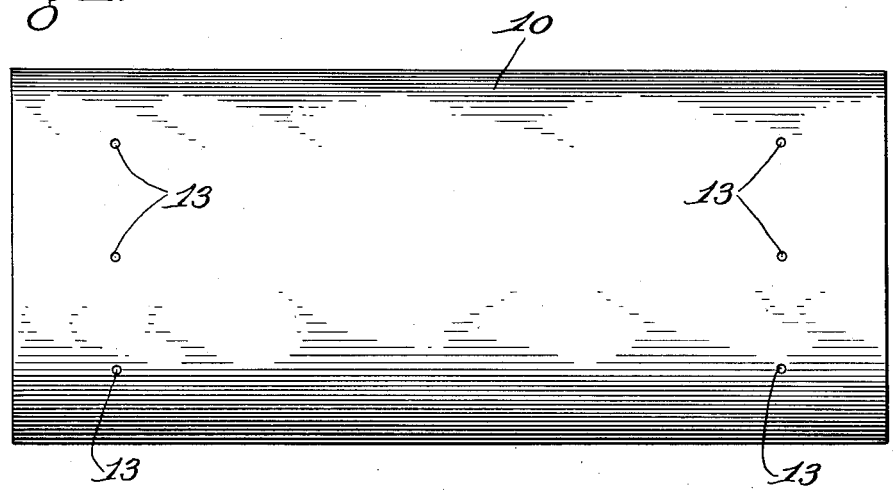
Figure 2:
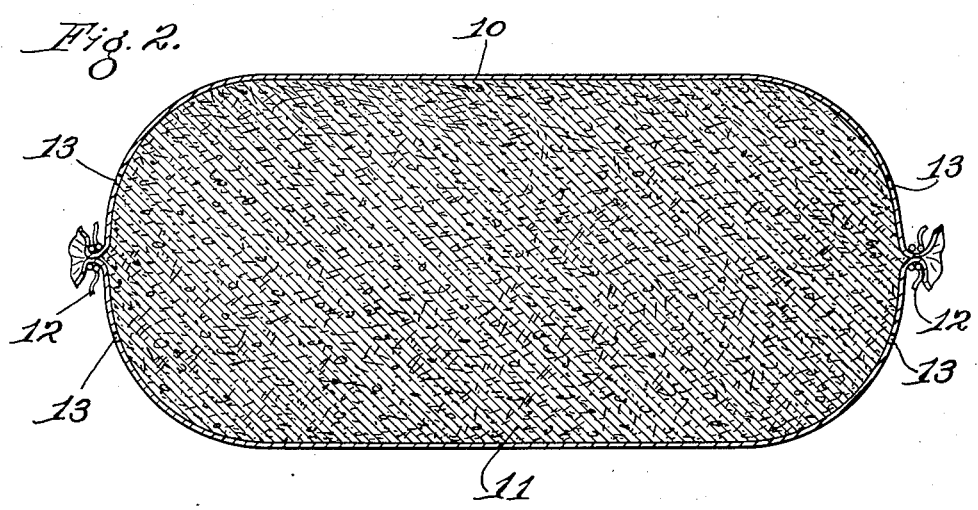

Figure 1 is a side elevation of a sausage casing which embodies the invention; and Figure 2 is a section through a sausage which is enclosed in the improved casing.

Referring to the drawing, the reference character 10 designates a cellulose sausage casing which, in Fig. 2, is shown applied to a sausage 11. The ends of the casing 10 are tied with cords 12 or the equivalent.

The casing 10 is provided with a plurality of perforations 13 at each end thereof. When the casing is to be employed in the manufacture of the larger sausages the apertures 13 are spaced about two inches from the ends of the casing and are preferably about one-fourth of an inch in diameter. Any suitable means may be employed in forming the apertures but I have preferably employed a punch similar to those employed in punching railroad tickets or the like. Care must be taken that the hole is clean and not ragged. Several of the apertures 13 are preferably punched in each end of the casing.

After the apertures 13 have been formed in the casing one end thereof is tied in the manner illustrated in Fig. 2 and is then stuffed. Then after the other end has been tied the sausage is completed.

It is readily understood that if the sausage is subsequently smoked and cooked, water and fat that is not absorbed by the sausage mixture will escape through the apertures 13.

The foregoing detailed description has been given for clearness of understanding only and no unnecessary limitations should be understood therefrom, but the appended claims should be construed as broadly as permissible, in view of the prior art.

What I regard as new, and desire to secure by Letters Patent, is:

1. The method of preparing a sausage casing for stuffing which comprises punching a plurality of apertures therein.

2. The method of preparing a sausage casing for stuffing which comprises forming a plurality of holes in it adjacent each of its ends.

3. A sausage casing having a plurality of apertures formed therein.

4. A sausage casing having a plurality of apertures formed therein adjacent each of its ends.

5. A cellulose sausage casing having a plurality of apertures formed therein adjacent one of its ends.

6. The method of producing sausage which comprises forming perforations in a sausage casing, stuffing said casing, and then smoking and cooking said sausage and permitting water and fat which are not absorbed by the sausage mixture to escape through said apertures.

In testimony whereof, I hereunto affix my name, this 10th day of Nov., 1930.

HASWELL R. DE CRESSEY.